(12) United States Patent
Yohn (10) Patent No.: US 10,583,668 B2
(45) Date of Patent: Mar. 10, 2020

(54) SYMBOL GROUPING AND STRIPING FOR WIDE FIELD MATRIX LASER MARKING

(71) Applicant: Markem-Imaje Corporation, Keene, NH (US)

(72) Inventor: Andrew Yohn, Keene, NH (US)

(73) Assignee: Markem-Imaje Corporation, Keene, NH (US)

(*) Notice: Subject to any disclaimer, the term of this patent is extended or adjusted under 35 U.S.C. 154(b) by 0 days.

(21) Appl. No.: 16/057,756

(22) Filed: Aug. 7, 2018

(65) Prior Publication Data
US 2020/0047519 A1    Feb. 13, 2020

(51) Int. Cl.
| B41J 2/435 | (2006.01) |
| B41J 2/44 | (2006.01) |
| G06K 1/12 | (2006.01) |
| G06K 15/12 | (2006.01) |

(52) U.S. Cl.
CPC .............. B41J 2/442 (2013.01); *B41J 2/435* (2013.01); *G06K 1/121* (2013.01); *G06K 1/126* (2013.01); *G06K 15/12* (2013.01)

(58) Field of Classification Search
CPC .... G06K 1/126; G06K 15/1228; G06K 15/12; G06K 1/121; B41J 2/442
See application file for complete search history.

(56) References Cited

U.S. PATENT DOCUMENTS

| 3,571,554 A | 3/1971 | Baujoin |
| 3,648,601 A | 3/1972 | Weidman |
| 3,714,393 A | 1/1973 | Johnson et al. |
| 3,725,655 A | 4/1973 | Edstrom et al. |
| 3,761,675 A | 9/1973 | Mason et al. |

(Continued)

FOREIGN PATENT DOCUMENTS

| DE | 400476 | 4/1922 |
| DE | 243798 | 11/1987 |

(Continued)

OTHER PUBLICATIONS

'wikipedia.com', [online] "Category: Cluster analysis algorithms", Aug. 2017, [retrieved on Jul. 22, 2018] Retrieved from the Internet: URL https://en.wikipedia.org/wiki/Category:Cluster_analysis_algorithms.

(Continued)

*Primary Examiner* — John Zimmermann
(74) *Attorney, Agent, or Firm* — Fish & Richardson P.C.

(57) ABSTRACT

Systems and methods for laser printing product codes on products include, in at least one aspect, a system including: a laser marking device that directs a laser beam to dwell at different locations to form marks on the products; and a controller that obtains a code to be printed, groups discrete symbols in the code with each other into separate symbol groups based on locations of the discrete symbols in the code, organizes symbol(s) in each respective symbol group into one or more stripes in a direction perpendicular to a direction of motion of the products, adds extra distance or time delay between stripes in at least one of the separate symbol groups to prevent clipping of a symbol by the laser marking device by the laser marking device's print aperture, and causes the laser marking device to direct the laser beam in accordance with the separate symbol groups.

21 Claims, 5 Drawing Sheets

(56) References Cited

U.S. PATENT DOCUMENTS

| | | |
|---|---|---|
| 3,803,637 A | 4/1974 | Martin et al. |
| 3,824,015 A | 7/1974 | Petit et al. |
| 3,848,104 A | 11/1974 | Locke |
| 3,863,565 A | 2/1975 | Patykula |
| 3,885,873 A | 5/1975 | Andermo |
| 3,898,417 A | 8/1975 | Atkinson |
| 3,975,261 A | 8/1976 | Beck |
| 4,011,437 A | 3/1977 | Hohn |
| 4,024,545 A | 5/1977 | Dowling et al. |
| 4,025,752 A | 5/1977 | Whitman, III |
| 4,049,945 A | 9/1977 | Ehlscheid et al. |
| 4,063,064 A | 12/1977 | Saunders et al. |
| 4,065,212 A | 12/1977 | Belleson et al. |
| 4,083,053 A | 4/1978 | Ouchi et al. |
| 4,086,522 A | 4/1978 | Engelberger et al. |
| 4,088,864 A | 5/1978 | Theeuwes et al. |
| 4,099,830 A | 7/1978 | Whittle et al. |
| 4,100,599 A | 7/1978 | Nally |
| 4,106,965 A | 8/1978 | Lee |
| 4,154,530 A | 5/1979 | Connolly, Jr. et al. |
| 4,160,894 A | 7/1979 | Stemmler et al. |
| 4,207,985 A | 6/1980 | Lockett et al. |
| 4,218,606 A | 8/1980 | Whitman, III |
| 4,240,017 A | 12/1980 | Uekusa |
| 4,271,968 A | 6/1981 | Mehrkam et al. |
| 4,283,145 A | 8/1981 | Miyazawa |
| 4,285,012 A | 8/1981 | Ohara et al. |
| 4,297,559 A | 10/1981 | Whitman, III |
| 4,307,282 A | 12/1981 | Gappa |
| 4,319,122 A | 3/1982 | Pope et al. |
| 4,323,755 A | 4/1982 | Nierenberg |
| 4,334,471 A | 6/1982 | Noyes et al. |
| 4,338,114 A | 7/1982 | Brockway et al. |
| 4,338,147 A | 7/1982 | Backstrom et al. |
| 4,354,196 A | 10/1982 | Neumann et al. |
| 4,371,782 A | 2/1983 | Brouwer |
| 4,375,025 A | 2/1983 | Carlson |
| 4,404,454 A | 9/1983 | Taylor et al. |
| 4,468,551 A | 8/1984 | Neiheisel |
| 4,480,169 A | 10/1984 | Macken |
| 4,497,995 A | 2/1985 | Nilsen |
| 4,517,436 A | 5/1985 | Lawrence |
| 4,557,386 A | 12/1985 | Buckley et al. |
| 4,560,856 A | 12/1985 | Miller et al. |
| 4,564,739 A | 1/1986 | Mattelin |
| 4,576,286 A | 3/1986 | Buckley et al. |
| 4,578,329 A | 3/1986 | Holsappel |
| 4,584,455 A | 4/1986 | Tomizawa |
| 4,587,396 A | 5/1986 | Rubin |
| 4,590,859 A | 5/1986 | Pou et al. |
| 4,618,759 A | 10/1986 | Muller et al. |
| 4,626,649 A | 12/1986 | Dupeyrat |
| 4,626,656 A | 12/1986 | Ootsuka et al. |
| 4,636,043 A | 1/1987 | Bellar |
| 4,638,144 A | 1/1987 | Latta, Jr. |
| 4,648,093 A | 3/1987 | Sasnett et al. |
| 4,652,722 A | 3/1987 | Stone et al. |
| 4,675,498 A | 6/1987 | Lemelson |
| 4,695,698 A | 9/1987 | Mayor et al. |
| 4,696,143 A | 9/1987 | Young |
| 4,703,166 A | 10/1987 | Bruning |
| 4,707,596 A | 11/1987 | Hohberg |
| 4,707,709 A | 11/1987 | Tsilibes |
| 4,720,618 A | 1/1988 | Stamer et al. |
| 4,725,709 A | 2/1988 | Mattelin |
| 4,727,235 A | 2/1988 | Stamer et al. |
| 4,734,558 A | 3/1988 | Nakano et al. |
| 4,736,187 A | 4/1988 | Kibrick et al. |
| 4,742,206 A | 5/1988 | Dietterich et al. |
| 4,758,703 A | 7/1988 | Dreyer et al. |
| 4,769,310 A | 9/1988 | Gugger et al. |
| 4,791,267 A | 12/1988 | Yokoyama et al. |
| 4,796,038 A | 1/1989 | Allen et al. |
| 4,797,532 A | 1/1989 | Maiorov |
| 4,799,215 A | 1/1989 | Suzuki |
| 4,803,336 A | 2/1989 | Myer |
| 4,806,727 A | 2/1989 | Ruckl |
| 4,808,790 A | 2/1989 | Ruckl |
| 4,822,973 A | 4/1989 | Fahner et al. |
| 4,852,020 A | 7/1989 | Morita |
| 4,854,696 A | 8/1989 | Guez |
| 4,861,620 A | 8/1989 | Azuma et al. |
| 4,870,623 A | 9/1989 | Buckley et al. |
| 4,874,919 A | 10/1989 | Bransden et al. |
| 4,901,073 A | 2/1990 | Kibrick |
| 4,906,813 A | 3/1990 | Gajdos |
| 4,914,437 A | 4/1990 | Kibrick et al. |
| 4,918,284 A | 4/1990 | Weisz |
| 4,941,082 A | 7/1990 | Pailthorp et al. |
| 4,952,789 A | 8/1990 | Suttie |
| 4,956,539 A | 9/1990 | Uesugi et al. |
| 4,965,829 A | 10/1990 | Lemelson |
| 4,969,134 A | 11/1990 | Balderson |
| 4,970,366 A | 11/1990 | Imatou et al. |
| 4,970,600 A | 11/1990 | Garnier et al. |
| 4,987,287 A | 1/1991 | Jack |
| 5,021,631 A | 6/1991 | Ravellat |
| 5,041,716 A | 8/1991 | Wakabayashi |
| 5,049,721 A | 9/1991 | Parnas et al. |
| 5,051,558 A | 9/1991 | Sukhman |
| 5,087,805 A | 2/1992 | Silverschotz et al. |
| 5,109,149 A | 4/1992 | Leung |
| 5,120,928 A | 6/1992 | Piliero |
| 5,132,510 A | 7/1992 | Klingel et al. |
| 5,166,505 A | 11/1992 | Gorriz et al. |
| 5,168,454 A | 12/1992 | LaPlante et al. |
| 5,170,279 A | 12/1992 | Schwartz et al. |
| 5,175,425 A | 12/1992 | Spratte et al. |
| 5,206,496 A | 4/1993 | Clement et al. |
| 5,229,573 A | 7/1993 | Stone et al. |
| 5,229,574 A | 7/1993 | Stone |
| 5,262,613 A | 11/1993 | Norris et al. |
| 5,283,773 A | 2/1994 | Thomas et al. |
| 5,294,942 A | 3/1994 | Loewenthal et al. |
| 5,327,529 A | 7/1994 | Fults et al. |
| 5,329,090 A | 7/1994 | Woelki et al. |
| 5,367,152 A | 11/1994 | Krichever et al. |
| 5,375,722 A | 12/1994 | Leary et al. |
| 5,401,960 A | 3/1995 | Fisun et al. |
| 5,515,480 A | 5/1996 | Frazier |
| 5,605,641 A | 2/1997 | Chiba et al. |
| 5,653,900 A | 8/1997 | Clement et al. |
| 5,680,384 A | 10/1997 | Seki et al. |
| 5,734,412 A | 3/1998 | Hasebe et al. |
| 5,751,436 A | 5/1998 | Kwon et al. |
| 5,767,483 A | 6/1998 | Cameraon et al. |
| 5,900,948 A | 5/1999 | Shigeeda et al. |
| 5,906,609 A | 5/1999 | Assa et al. |
| 5,938,657 A | 8/1999 | Assa et al. |
| 5,966,457 A | 10/1999 | Lemelson |
| 5,990,444 A | 11/1999 | Gostin |
| 6,049,055 A | 4/2000 | Fannash et al. |
| 6,061,081 A | 5/2000 | Hasebe et al. |
| 6,066,829 A | 5/2000 | Ishikawa |
| 6,107,600 A | 8/2000 | Kurosawa et al. |
| 6,121,067 A | 9/2000 | Canella |
| 6,121,574 A | 9/2000 | Xu |
| 6,160,835 A | 12/2000 | Kwon |
| 6,351,324 B1 | 2/2002 | Flint et al. |
| 6,424,430 B1 | 7/2002 | Bilodeau et al. |
| 6,433,303 B1 | 8/2002 | Liu et al. |
| 6,518,540 B1 | 2/2003 | Wee et al. |
| 6,676,878 B2 | 1/2004 | O'Brien et al. |
| 6,681,055 B1 | 1/2004 | Sato |
| 6,697,408 B2 | 2/2004 | Kennedy et al. |
| 6,734,392 B2 | 5/2004 | Philipp et al. |
| 6,791,592 B2 | 9/2004 | Assa et al. |
| 6,826,204 B2 | 11/2004 | Kennedy et al. |
| 6,888,095 B2 | 5/2005 | Khan |
| 6,958,762 B2 | 10/2005 | Franklin |
| 7,046,267 B2 | 5/2006 | Franklin et al. |
| 7,167,194 B2 | 1/2007 | Assa et al. |
| 7,191,019 B2 | 3/2007 | Verstraeten |
| 7,355,614 B2 | 4/2008 | Franklin |

(56) References Cited

U.S. PATENT DOCUMENTS

| | | | |
|---|---|---|---|
| 2003/0011672 A1 | 1/2003 | Emge et al. | |
| 2005/0061781 A1* | 3/2005 | Jense | B23K 26/0846 219/121.8 |
| 2006/0012667 A1* | 1/2006 | Franklin | G06K 1/126 347/225 |
| 2007/0279474 A1* | 12/2007 | Sato | G06K 1/126 347/110 |
| 2015/0009272 A1* | 1/2015 | Yohn | B41J 2/442 347/247 |

FOREIGN PATENT DOCUMENTS

| | | |
|---|---|---|
| EP | 0141724 | 5/1985 |
| EP | 0168351 | 1/1986 |
| EP | 0176872 | 4/1986 |
| EP | 0215389 | 3/1987 |
| EP | 0233146 | 8/1987 |
| EP | 0244574 | 11/1987 |
| EP | 0262225 | 4/1988 |
| EP | 0276995 | 8/1988 |
| EP | 0316347 | 5/1989 |
| EP | 0391539 | 10/1990 |
| EP | 0391540 | 10/1990 |
| EP | 0400476 | 12/1990 |
| EP | 0419377 | 3/1991 |
| EP | 0420198 | 4/1991 |
| EP | 0446482 | 9/1991 |
| EP | 0446887 | 9/1991 |
| EP | 0453733 | 10/1991 |
| EP | 0464270 | 1/1992 |
| EP | 0495647 | 7/1992 |
| EP | 0516199 | 12/1992 |
| EP | 0519391 | 12/1992 |
| EP | 0531565 | 3/1993 |
| EP | 0531584 | 3/1993 |
| EP | 0402298 | 7/1993 |
| EP | 0729806 | 9/1996 |
| EP | 0729906 | 6/2000 |
| ES | 2013193 | 4/1990 |
| FR | 2271683 | 12/1975 |
| FR | 2450455 | 9/1980 |
| GB | 1360380 | 7/1974 |
| GB | 1450251 | 9/1976 |
| GB | 1467152 | 3/1977 |
| GB | 1541214 | 2/1979 |
| GB | 2059354 | 4/1981 |
| GB | 2073639 | 10/1981 |
| GB | 2078621 | 1/1982 |
| GB | 2126955 | 4/1984 |
| GB | 2131417 | 6/1984 |
| GB | 2133180 | 7/1984 |
| GB | 2133352 | 7/1984 |
| GB | 2157851 | 10/1985 |
| GB | 2169282 | 7/1986 |
| GB | 2202647 | 9/1988 |
| GB | 2229389 | 9/1990 |
| GB | 2247677 | 3/1992 |
| GB | 2252068 | 7/1992 |
| GB | 2253282 | 9/1992 |
| GB | 2 291 719 | 1/1996 |
| JP | 5229740 | 3/1977 |
| JP | 5511824 | 1/1980 |
| JP | 5714981 | 1/1982 |
| JP | 5781984 | 5/1982 |
| JP | 5796865 | 6/1982 |
| JP | 5942194 | 3/1984 |
| JP | 5945091 | 3/1984 |
| JP | 5973191 | 5/1984 |
| JP | 59207246 | 11/1984 |
| JP | 60106686 | 6/1985 |
| JP | 60227994 | 11/1985 |
| JP | 63248589 | 10/1988 |
| JP | 63174314 | 11/1988 |
| JP | 2863872 | 12/1988 |
| JP | 6411083 | 1/1989 |
| JP | 1166893 | 6/1989 |
| JP | 215887 | 1/1990 |
| JP | 2187288 | 7/1990 |
| JP | 2187289 | 7/1990 |
| JP | 2217186 | 8/1990 |
| JP | 376677 | 4/1991 |
| JP | 5169286 | 7/1993 |
| JP | 20057471 | 1/2005 |
| WO | WO 1981/01889 | 7/1981 |
| WO | WO 1982/00635 | 3/1982 |
| WO | WO 1985/00123 | 1/1985 |
| WO | WO 1986/04549 | 8/1986 |
| WO | WO 1989/01385 | 2/1989 |
| WO | WO 1990/00459 | 1/1990 |
| WO | WO 1990/04223 | 4/1990 |
| WO | WO 1991/04828 | 4/1991 |
| WO | WO 1991/12923 | 5/1991 |
| WO | WO 1992/04155 | 3/1992 |
| WO | WO 1992/09399 | 6/1992 |
| WO | WO 1992/12820 | 8/1992 |
| WO | WO 1993/15029 | 8/1993 |
| WO | WO 2002/12411 | 2/2002 |
| WO | WO2016118962 A1 | 7/2016 |

OTHER PUBLICATIONS

'wikipedia.com', [online] "Cluster analysis", Jun. 2018, [retrieved on Jul. 22, 2018] Retrieved from the Internet: URL https://en.wikipedia.org/wiki/Cluster_analysis.

"Beam-Steered Laser Marking on Parts in Motion", http://www.semiconductorfabtech.com/features/tap_old/articles/06.427.html, retrieved Oct. 6, 2000.

"CLC ControlLaser Corporation", printout Mar. 6, 2000.

"Coming soon! The FH-Series "Tracker" Marking Head" http://www.winmarkpro.com/PressReleases/Tracker.htm, Mar. 2000, retrieved Oct. 6, 2000.

"FH-Series Marking Head", http://www.winmarkpro.com/Products/marking.htm, retrieved Oct. 6, 2000.

"Industrial Dynamics Offers the Lasetec Laser Printer for Higher Quality Product Information and Codes at High Speeds on Bottles, Cans, Packages", http://www.filtec.com/newpage1,htm, 1999-2000, retrieved Oct. 6, 2000.

"Laser Systems—Medical Device Manufacturing", http://www.gsilumonics.com/markets%5Fframe/medical/marking.htm, GSI Lumonics 2000, retrieved Oct. 6, 2000.

"LaserPro DM Laser Coding System", http://www.marconidata.com/products/prod_laserpro_dm.html, 1997-2000, retrieved Oct. 7, 2000.

"Overview of WinLaseNTTM Marker Suite", http://www.alase.com/software/software.html, retrieved Oct. 6, 2000.

"ProLase for Window's 95 Features", http://laserware.com/95Features.html, retrieved Oct. 6, 2000.

"SCAN jet", http://www.scanlab.de/jetmain.html, retrieved Oct. 6, 2000.

"SCANjet—more information", http://www.scanlab.de/jetmain2.html, retrieved Oct. 6, 2000.

"SolarJet: Laser Marking 'On the Fly' System for High Speed Package Coding", http://www.wlsc.com/solarjet.htm, retrieved Oct. 7, 2000.

"Videojet Announces New Position in Laser Coding Market", Press Release, http://www.marconidata.com/press/laser_pr.html, 1997-1999, retrieved Oct. 7, 2000.

"What's Ahead in Marking and Labeling", Modern Materials Handling, Oct. 1985.

Allen, L. "Automatic Identification: How Do You Choose It, & Where Do You Use It?", Automation, Jul. 1991.

BetaMark-2000 product description, http://www.hi-laser.com/eng/equipment/betamark2000.htm, retrieved Oct. 7, 2000

Dambrot, S. "Applications Drive Japan's Laser Industry", Photonics, Jul. 1992.

FH Series Marking Head, Marking Specifications, http://www.winmarkpro.com/Products/FHSpecs.html, retrieved Oct. 6, 2000.

(56) References Cited

OTHER PUBLICATIONS

Front Range Laser, http://www.frontrangelaser.net/products.htm, Jun. 9, 2000, retrieved Oct. 7, 2000.
Industrial Laser Source, "Software for High Speed Galvonometer/Scanner for Marking or Cutting on the Fly", http://www.lasertubes.com/software.htm, retrieved Oct. 7, 2000.
Inglesby, T. "Printers on the Floor and in the Bars", Manufacturing Systems, Feb. 1992.
Kirkland, C. "Hydraulic Pumps: Fixed vs. Variable Volume", Plastics World, Oct. 1991.
LaCosse, D. "Manufacturing Begins With Product Marking", Automation, Sep. 1988.
Lang, N. "Packaging Parade", Beverage World, Jan. 1991.
Laser Technology Centre company description, http://www.hi-laser.com/eng/about/about.htm, 2000, retrieved Oct. 7, 2000.
Makadok, S. "Production Realities: Faster, Smarter a Must", Beverage Industry, vol. 83, No. 12, Dec. 1992.
Mark, "Lasers Help Capacitor Maker Gain Good Marks", Production Engineering, Jul. 1983.
Mikami, T et al. "A Correction Method for Laser Scanning Errors in High Speed Laser Printers", Fujitsu, vol. 18, No. 4, 1982.
Mikoh Corporation Limited, http://www.mikoh.com/index.html, retrieved Oct. 6, 2000.
Redmond, B. "Demand Calls the Tune", Materials Handling News, Jul. 1985.
Samuels, M. "PLC and PC Join to Automate Laser Assembly", Production Engineering, Mar. 1987.
Seideman, T. "BC Labels Turn High-Tech", http://web4.infotrac.galegroup.com, vol. 92, No. 1, p. 83(2), Jan. 1993.
Solaris Laser S.A., http://www.solarislaser.com.pl/index.htm, retrieved Oct. 7, 2000.
Spencer, J. "Labeling & Marking", Handling and Shipping Management, Jan. 1983.
Stovicek, D. "No Longer Science Fiction, Lasers are Now a Part of Every Day Life in Industry", Automation, Aug. 1989.
European Patent Application No. 19189510.1, Extended European Search Report dated Jan. 27, 2020, 6 pages.

* cited by examiner

SYMBOL GROUPING AND STRIPING FOR WIDE FIELD MATRIX LASER MARKING

BACKGROUND

This specification relates to industrial printing systems, and in particular, systems and techniques relating to laser printing product codes on the packaging of products in a manufacturing or distribution facility.

Various industrial printing technologies are known and enable the printing of important information (e.g., sell by dates) on packaging. Dot-matrix type laser marking devices have been used to print identification code on commercial products. These codes are readily observable on common products such as soda cans, cosmetics, pet food containers, etc. Some government regulatory agencies, such as the Food and Drug Administration in the U.S., may require certain products to have such codes. These codes often include information that is unique to the time and place at which the product is manufactured. For instance, many codes communicate a batch number associated with a product. Many codes go further and indicate the actual time and date of manufacture. Because some codes relate to unique manufacturing parameters (e.g., time and date), some codes cannot be pre-printed on a label for a product. Hence, a code is often printed on the label after the product is manufactured. U.S. Pat. No. 7,046,267 describes a laser printing system that organizes an image into a sequence of "stripes" for laser printing so as to provide an efficient print order of characters and symbols, which can improve printing by using more of the laser's exposure window (aperture) and reducing an amount of laser deflection motion between marking operations.

SUMMARY

This specification describes technologies relating to industrial printing systems, and in particular, systems and techniques relating to laser printing product codes on the packaging of products in a manufacturing or distribution facility.

In general, one or more aspects of the subject matter described in this specification can be embodied in one or more methods that include: obtaining a code to be printed on one or more products by a laser marking device configured to direct a laser beam in two orthogonal directions to move between different locations and to dwell at the different locations to form marks on the one or more products; grouping discrete symbols in the code with each other into separate symbol groups based on locations of the discrete symbols in the code; organizing one or more symbols in each respective symbol group into one or more stripes in a direction perpendicular to a direction of motion of the one or more products in a product line configured to move products through a facility; adding an extra distance or a time delay between stripes in at least one of the separate symbol groups to prevent clipping of a symbol by the laser marking device due to a print aperture of the laser marking device; and causing the laser marking device to direct the laser beam in accordance with the separate symbol groups, including using the extra distance or the time delay between the stripes in the at least one of the separate symbol groups. These and other embodiments can optionally include one or more of the following features.

The method(s) can include: assigning a group print priority to the separate symbol groups in accordance with a time at which each respective symbol group enters the print aperture of the laser marking device; and assigning, for each of the separate symbol groups having two or more stripes, a stripe print priority to the two or more stripes in accordance with a time at which each respective stripe enters the print aperture of the laser marking device; wherein causing the laser marking device to direct the laser beam in accordance with the separate symbol groups includes causing the laser marking device to direct the laser beam to print the separate symbol groups in an order of the group print priority and to print the two or more stripes within a symbol group in an order of the stripe print priority.

The method(s) can include: organizing the separate symbol groups into stripes of groups in the direction perpendicular to the direction of motion of the one or more products in the product line configured to move products through the facility; wherein assigning the group print priority includes treating each of the stripes of groups as a single group for priority assignment. The separate symbol groups organized into stripes of groups can include at least four separate symbol groups. Obtaining the code to be printed on the one or more products by the laser marking device can include: receiving an image to be printed; receiving X and Y coordinates corresponding to the two orthogonal directions; and replicating the image in accordance with the X and Y coordinates to form the code to be printed.

Grouping the discrete symbols in the code can include grouping the discrete symbols in the code based on proximity of the discrete symbols to each other. Grouping the discrete symbols in the code can include: defining a containing boundary for each of the discrete symbols in the code; and grouping discrete symbols whose containing boundaries overlap each other. The containing boundary for each discrete symbol can be set as a circle having a diameter equal to one and a half times a size of the symbol. The containing boundary for each discrete symbol can be set in accordance with user input.

The one or more methods can be implemented using a computer readable medium encoding instructions operable to cause data processing apparatus to perform operations of the one or more methods. Further a system can include: a product line configured to move products through a facility; a laser marking device arranged with respect to the product line and configured to direct a laser beam in two orthogonal directions to move between different locations and to dwell at the different locations to form marks on the products; and a laser marking device controller communicatively coupled with the laser marking device, the laser marking device controller being configured to obtain a code to be printed on the products, group discrete symbols in the code with each other into separate symbol groups based on locations of the discrete symbols in the code, organize one or more symbols in each respective symbol group into one or more stripes in a direction perpendicular to a direction of motion of the products in the product line, add an extra distance or a time delay between stripes in at least one of the separate symbol groups to prevent clipping of a symbol by the laser marking device due to a print aperture of the laser marking device, and cause the laser marking device to direct the laser beam in accordance with the separate symbol groups, including using the extra distance or the time delay between the stripes in the at least one of the separate symbol groups. These and other embodiments can optionally include one or more of the following features.

The laser marking device controller can be configured to assign a group print priority to the separate symbol groups in accordance with a time at which each respective symbol group enters the print aperture of the laser marking device, assign, for each of the separate symbol groups having two or more stripes, a stripe print priority to the two or more stripes in accordance with a time at which each respective stripe enters the print aperture of the laser marking device, and cause the laser marking device to direct the laser beam to print the separate symbol groups in an order of the group print priority and to print the two or more stripes within a symbol group in an order of the stripe print priority.

The laser marking device controller can be configured to organize the separate symbol groups into stripes of groups in the direction perpendicular to the direction of motion of the one or more products in the product line configured to move products through the facility, and treat each of the stripes of groups as a single group for priority assignment. The separate symbol groups organized into stripes of groups can include at least four separate symbol groups. The laser marking device controller can be configured to obtain the code to be printed on the one or more products by the laser marking device by receiving an image to be printed, receive X and Y coordinates corresponding to the two orthogonal directions, and replicate the image in accordance with the X and Y coordinates to form the code to be printed.

The laser marking device controller can be configured to group the discrete symbols in the code based on proximity of the discrete symbols to each other. The laser marking device controller can be configured to group the discrete symbols in the code by defining a containing boundary for each of the discrete symbols in the code, and grouping discrete symbols whose containing boundaries overlap each other. The containing boundary for each discrete symbol can be set as a circle having a diameter equal to one and a half times a size of the symbol. The containing boundary for each discrete symbol can be set in accordance with user input. The laser marking device controller can include: electronics that are integrated with the laser marking device; and a computer that is separate from the laser marking device. The facility can be a product manufacturing facility and the product line is a product packaging system.

Various embodiments of the subject matter described in this specification can be implemented to realize one or more of the following advantages. The effective use of a laser marking device's exposure window (aperture) can be increased, and an amount of laser beam deflection motion between dwell locations (where marks are made) can be reduced. For wide field laser marking applications, e.g., code matrix marking applications, a code striping technique can employ a symbol grouping technique to reduce print time and/or improve print quality by determining an efficient print order of different portions of a complex code/image. In some cases, up to a 25% reduction in print time can be achieved on typical images in wide field, code matrix laser marking applications.

Clipping correction can be implemented using the stripes formed for the code so as to successfully print (without clipping) codes on slow and fast moving products, as well as products that change speed, without requiring control of the speed of the product on a product line. Moreover, the systems and techniques described are also usable (and beneficial) with products that are stationary during a laser printing operation. For example, if the product is held temporarily stationary on a product line at a laser printing station for the entire printing of a code, the systems and techniques described can still improve the laser printing by optimizing the mirror movement to minimize jump distances, which reduces the overall print time, resulting in higher throughput on a product line.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
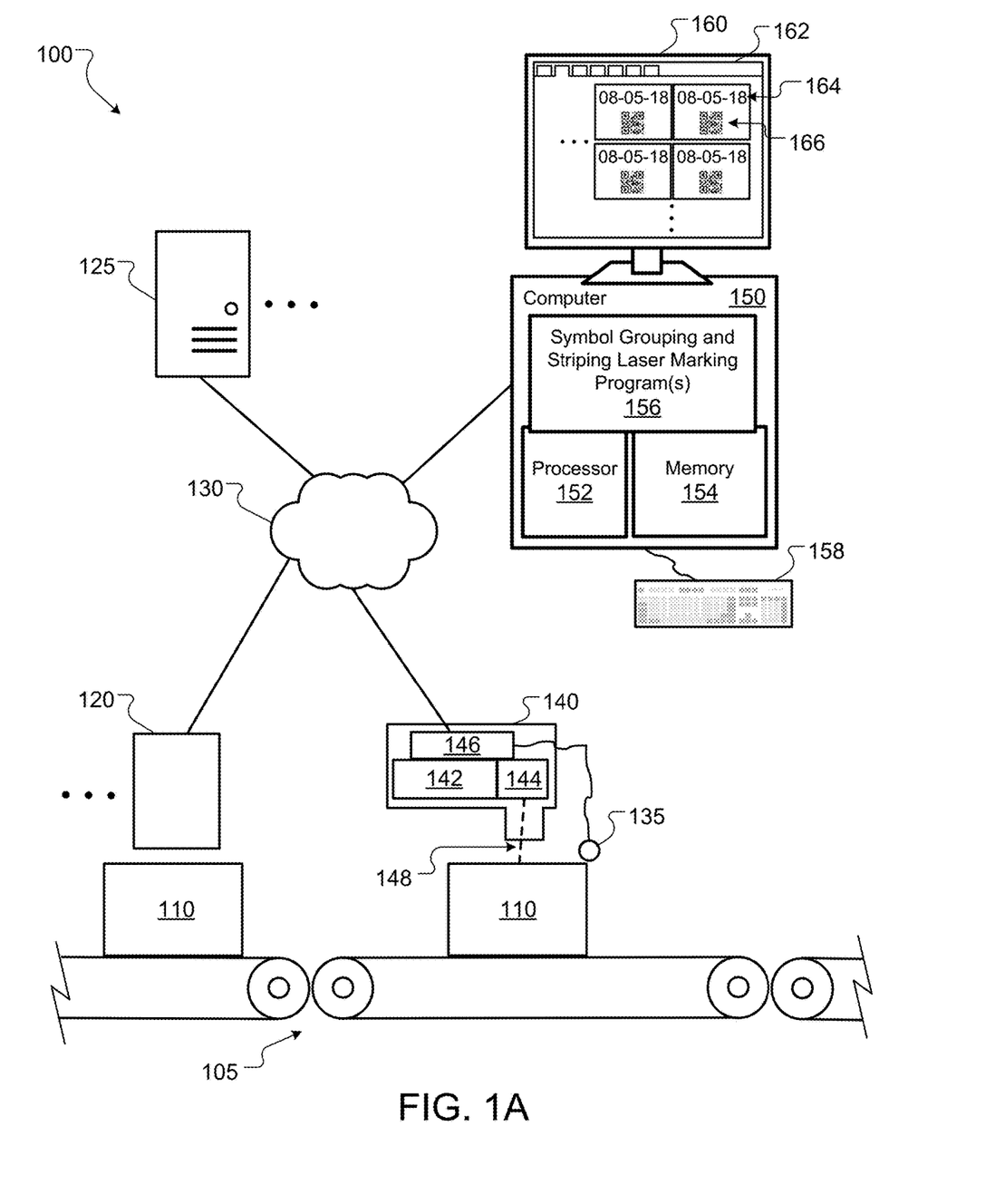
FIG. 1A shows an example of a laser marking system usable to print codes on products.

FIG. 1A shows an example of a laser marking system 100 usable to print codes on products. The system 100 includes a product line configured to move products 110 through a facility, which can include one or more conveyor belts 105 and/or one or more other product movement mechanisms. The facility can be a product manufacturing facility, a product distribution facility, and/or other industrial/business facilities/buildings, and the product line can include a product packaging system, a product sorting system, and/or other product handling/management systems.

In some implementations, the system 100 includes one or more product interaction units 120 that are communicatively coupled with one or more control computers 125 through a network 130. The product interaction units 120 can include various systems and devices, such as printers or RFID (radio frequency identification) stations for encoding information on the product 110, scales to weigh the product 110, various mechanical actuators to move the product 110 in particular ways, etc. The network 130 can be a private network, a public network, a virtual private network, etc., and the network 130 can include wired and/or wireless networks. For additional details regarding systems and techniques for product line configuration, see U.S. Pat. No. 7,191,019, issued on 13 Mar. 2007, and entitled, "DYNAMIC LINE CONFIGURATION".

The system 100 includes at least one laser marking device 140 that is configured and arranged in proximity to the product line to mark the products 110 with codes, as desired by a system operator. Note that the "products" 110 can be individual consumer units, boxes of units for delivery (dispatch units), and/or whole pallets of units or boxes, as well as the packaging or labelling for any of the foregoing. Thus, in some implementations, the laser marking device 140 is a device that steers a laser beam to print codes on labels, which are then supplied to a label applicator that applies the labels to the product. In any case, the laser marking device 140 effects the marking of products 110 (e.g., product labels) with product codes and is proximate to the product line in that it is close enough to print the codes directly on a merchandise unit, packaging for a merchandise unit, or a label for a merchandise unit.

The laser marking device 140 includes a laser source 142 configured to produce a laser printing beam 148, and an optics assembly 144 configured to direct the laser beam 148 in two orthogonal directions (e.g., using X and Y galvanometers) in accordance with control signals from electronics 146. The electronics 146 can include one or more processors that execute instructions (e.g., stored in memory in the electronics 146) to control the operation of the laser marking device 140. Suitable processors include, but are not limited to, microprocessors, digital signal processors (DSP), microcontrollers, integrated circuits, application specific integrated circuits (ASICs), logic gate arrays and switching arrays. The electronics 146 can also include one or more memories for storing instructions to be carried out by the one or more processors and/or for storing data developed during operation of the laser marking device 140. Suitable memories include, but are not limited to, Random Access Memory (RAM), Flash RAM, and electronic read-only memories (e.g., ROM, EPROM, or EEPROM).

The electronics 146 control operations of the laser source 142 and the optics assembly 144. The optics assembly 144 can (in addition to redirecting the laser beam 148 toward the product 110) include low angle optics and reversed optics usable (under the control of the electronics 146) to steer the laser beam 148 between locations on the product 110, and dwell at the locations to mark the product 110. The "dwell time" can be adjusted based on the product 110 and the laser source 142 to ensure appropriate marks are created on the products 110. Note that the "dwell time" can include simply slowing the laser beam 148 down in the vicinity of the location to be marked, rather than requiring a complete stop of the laser beam 148. In any case, the electronics 146 cause the laser beam 148 to move quickly between the different dwell locations, e.g., such that the laser beam 148 does not leave a noticeable mark on the product 110 between these locations.

The electronics 146 can also be in communication with one or more sensors 135. These sensor(s) 135 can provide the electronics 146 with information about the products 110 on which the laser marking device 140 is to print. For instance, the sensor(s) 135 can indicate the location of a product 110 relative to the laser marking device 140, the direction that a product 110 is moving, a speed of a moving product 110, when a moving product 110 has been stopped, and when a product 110 is in the correct position to be printed upon. Suitable sensors 135 can include, but are not limited to, a speed sensor for detecting the speed and/or direction that a product 110 is moving (e.g., encoders and resolvers) and a location sensor for indicating when a product 110 is positioned in front of the sensor 135 (e.g., a print trigger formed from a light beam generator and light sensor, where blocking of the light beam by the product 110 indicates the product 110 is in position for printing, or initiates a countdown for a time delay before the product 110 is in position for printing, e.g., a code position time delay that causes the code to be printed at a desired position on the product 110).

Moreover, in some implementations, a stop mechanism can be used to temporarily stop the product 110 for printing with the laser beam 148. Such mechanisms can include a mechanical stop that prevents the product 110 from moving even though a conveyor belt 105 is still moving, or a functional control stop that temporarily stops the conveyor belt 105 (or other product movement system) and thus the product 110. The product can be held stationary for the entire printing of the code, or the product can be stationary for only a portion of the time the laser printing of the code occurs, such as stopping the product mid-print, or stopping the product at the beginning of a print or at the end of the print. Moreover, in some implementations, the laser marking device 140 can employ pixel prioritization and motion-corrected dwell-location data generation techniques to print on moving products 110, such as described in U.S. Pat. No. 7,167,194, issued on 23 Jan. 2007, and entitled, "PRINTING A CODE ON A PRODUCT", which is hereby incorporated by reference.

The laser source 142 can be a continuous wave (CW) or pulsed laser light source, a fundamental mode or multi-mode laser light source, a $CO_2$ or a CO laser light source, or a combination thereof. The laser beam 148 formed by the laser source 142 has enough power to alter an optical characteristic of the product 110 to form a spot when the laser beam 148 dwells at a location. The printing laser beam 148 can alter a variety of optical characteristics of a product 110. For instance, the printing beam 148 can cause one or more layers of material to be ablated so the underlying layers are visible. Since upper layers of a material often have an ink layer on paper, removal of the ink layer leaves a spot where the paper is visible against the surrounding ink layer. The refractive characteristics of a material can also be altered. For instance, the printing beam 148 can be used to print a code on a plastic such as a soft drink bottle. The printing beam alters the refractive characteristics of the plastic. The code is easily visible since the eye can pick up the sections having contrasting refractive properties.

In addition, the printing beam can etch certain materials, or the product 110 can include a phase change material that changes (e.g., color) in response to laser light. Thus, a wide variety of laser sources 142 can be used in the laser marking device 140, depending on the nature of the products 110 to be marked. This can include low power lasers, such as a $CO_2$ air cooled laser, e.g., a 25 Watt $CO_2$ laser, a 20 Watt $CO_2$ laser, a 15 Watt $CO_2$ laser, or a 13 Watt $CO_2$ laser. Note that, for low power lasers, the dwell time can often be increased as needed to ensure an adequate mark is made on the product 110.

The locations on the product 110 can be arranged such that the spots form symbols of a code on the product (e.g., pixels of an alphanumeric code). The symbols of the code can be alphanumeric characters (e.g., user specified text or time/date information), logos or graphics, barcodes (e.g., one dimensional (1D) or two dimensional (2D) barcodes), or a combination of the foregoing. For example, the electronics 146 can control the optics assembly 144 to direct the laser printing beam 148 to dwell at different locations on the product 110 to mark the product in accordance with instructions received from a control computer 125, such as a computer 150.

The computer 150 includes a processor 152 and a memory 154, and the computer 150 can be coupled with the laser marking device 140 either directly or through the network 130 (as shown). The processor 152 can be one or more hardware processors, which can each include multiple processor cores. The memory 154 can include both volatile and non-volatile memory, such as RAM and Flash RAM. The computer 150 can include various types of computer storage media and devices, which can include the memory 154, to store instructions of programs that run on the processor 152.

In some implementations, a program 156 presents a user interface (UI) 162 on a display device 160 of the computer 150, which can be operated using one or more input devices 158 of the computer 150 (e.g., keyboard and mouse). Note that while shown as separate devices in FIG. 1, the display device 160 and/or input devices 158 can also be integrated with each other and/or with the computer 150, such as in a tablet computer, where the one or more input devices 158 can be part of a touch screen display 160. Thus, the computer 150 can be a wireless tablet device used as a handheld controller for the laser marking device 140.

The program(s) 156 can include a symbol grouping and striping laser marking program 156. Although shown in FIG. 1A as being included together in a program at the computer 150, other program configuration and distribution is possible. Two separate programs 156 can be used: a symbol grouping program 156 and a striping laser marking program 156. Further, as noted above, the electronics 146 can include a processor and a memory, such as the processor 152 and the memory 154, and so a program 156 can also be included in the electronics 146. In some implementations, a symbol grouping program 156 resides at the computer 150 to provide the user interface 162, to assist in building the product code, and to define the groups for the product code; and a striping laser marking program 156 resides at the electronics 146 in the laser marking device 140.

Thus, for example, by doing all the stripe creation entirely within the printer electronics 146, the computer 150 need not be provided any information regarding the print direction for the product code being used with the product line. In the example shown, a product code includes both a sell-by-date 164 and a 2D barcode 166 (e.g., a QR (quick response) code). Note that the example used in FIG. 1A, e.g., "08-05-18" for sell-by-date 164, is arbitrary in that the information included in the product codes will depend on the particular product and the time and/or location of its manufacture/distribution. Other codes are also possible, such as codes that include a logo or graphic and a 1D barcode.

Figure 1B:
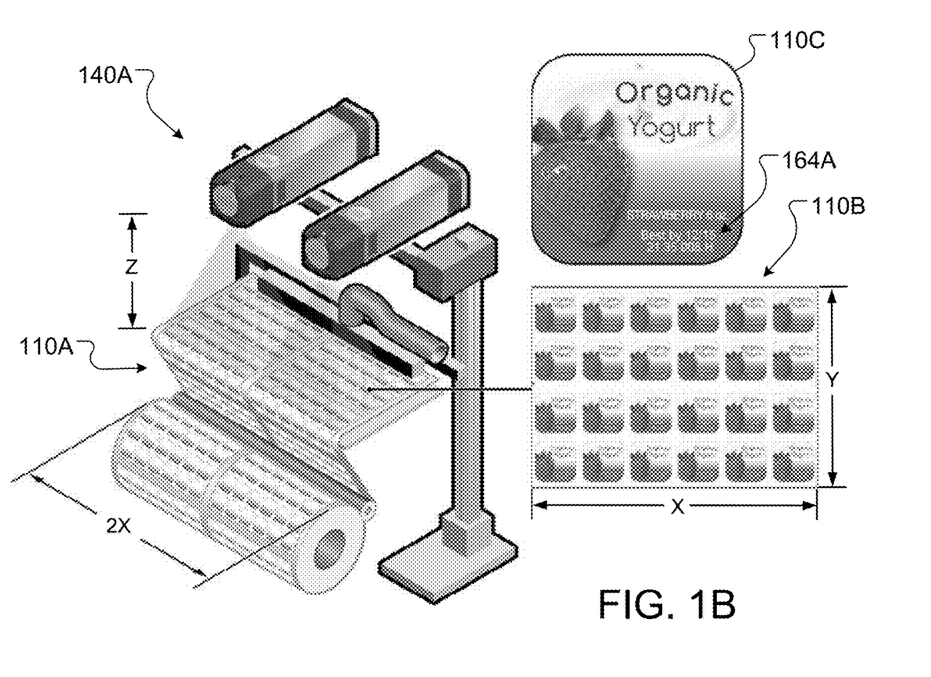
FIG. 1B shows an example of a laser marking device usable to print codes across a wide field.

Because the products 110 are on a moving product line, and the products 110 themselves may be moving during laser printing thereon, there is a limited amount of time available for printing on each product. Moreover, as the field of view of the laser is increased, so as to enable printing a code on multiple products per code print sequence, the available time is limited still further. For example, FIG. 1B shows two laser marking devices 140A mounted side-by-side at a label marking station, where each of the laser marking devices 140A is configured to direct its laser beam in two orthogonal directions (X & Y) across a wide field to mark a wide web foil 110A that will be attached to product packaging.

Note that increasing the distance (Z) between the laser marking devices 140A and the wide web foil 110A increases the effective aperture of the laser for marking, which allows for a wider sheet 110B and more product cover labels to be marked with a single, large matrix code composed of sub-codes 164A for each individual product cover label 110C. For a given type of laser and speed of laser beam steering, the upper limit on the size of this single, large matrix code depends on the material being marked (i.e., how much dwell time is needed between the different locations to form the marks making up the code) and the selected ordering of the marking locations (i.e., how many jumps of what distances does the laser beam need to make to mark the code). To handle such wider field laser marking applications, a code striping technique employs a symbol grouping technique to manage print time and quality.

Figure 2A:
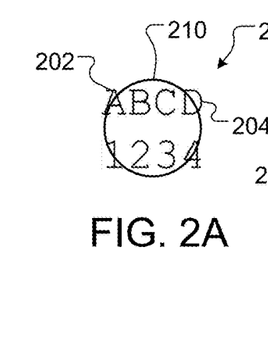
FIG. 2A shows an example of a code to be printed through a laser aperture.

FIG. 2A shows an example of a code 200 to be printed through a laser aperture 210. The code 200 in this example is two lines of text: "ABCD" over "1234". The aperture 210 (shown here as very small for illustrative purposes only) is the area within which the laser (e.g., laser beam 148 in FIG. 1A) can effectively print. Although this aperture 210 can be a physical window, this aperture 210 is typically a result of the limitations of the optics assembly (e.g., optics assembly 144 in FIG. 1A). In general, the aperture for a steered laser beam marking device defines the area within which the optics assembly will allow the printing device to print (e.g., on a moving product 110 in FIG. 1A) without an undesirable loss of print quality. Thus, in the example shown, not all symbols of the code 200 can be printed through the aperture 210 at the same time, e.g., the symbol "A" 202 and the symbol "D" 204 are outside the aperture 210 when the symbols "B" and "C" are inside the aperture.

To address such issues, pixel prioritization and motion-corrected dwell-location data generation techniques can be used, such as described in U.S. Pat. No. 7,167,194. Thus, each symbol of the code 200 can be formed from pixels/spots, and the order of marking these pixels/spots changed to account for the space limitations of the aperture 210 and the time limitations for a product moving under the aperture 210. Moreover, the data set used to direct the laser beam to the selected and ordered dwell-locations (for marking the pixels/spots) can be adjusted to account for a moving product, and the program(s) can also adjust the marking locations to compensate for any distortion introduced to the laser beam path by a lens in the optics assembly.

Figures 2B, 2C:
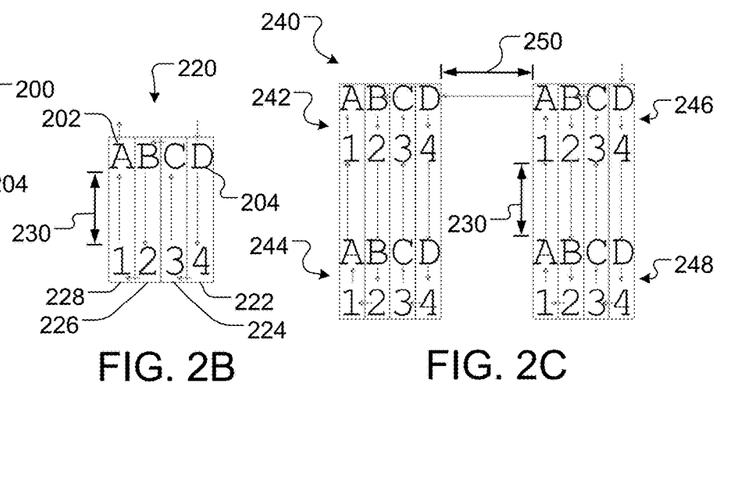
FIG. 2B shows an example of stripes created for the code of FIG. 2A.
FIG. 2C shows an example of stripes created for a larger, matrix code to be printed through a laser aperture.

In addition, a striping technique can be employed for the code 200. FIG. 2B shows an example of stripes 220 created for the code 200 of FIG. 2A. Striping refers to organizing a code (e.g., a list of control points for the laser beam, with an order of the control points to be marked) composed of symbols into a plurality of stripes or segments of data sets formed from those symbols. A program (e.g., program 156, e.g., in electronics 146) organizes the code 200 into stripes 220 in a direction perpendicular to the motion of the product. In this example, the stripes are vertical for a horizontally moving product, but the stripes can also be horizontal for a vertically moving product.

In the example shown, a first stripe 222 includes the symbol "D" and the symbol "4", a second stripe 224 includes the symbol "C" and the symbol "3", a third stripe 226 includes the symbol "B" and the symbol "2", and a fourth stripe 228 includes the symbol "A" and the symbol "1". The order of operations for the laser beam steering in this instance (as shown by the single headed arrows in FIG. 2B) is thus as follows: start with the first stripe 222 by marking the locations defining the "D" symbol 204, jump to and mark the locations of the next symbol "4" in the first stripe 222, then proceed with marking the second stripe 224, followed by the third stripe 226, and finish with the fourth stripe 228. As shown, the distance of laser beam jumps should be reduced as much as possible, and so the marking operations alternate between starting at the top of a stripe 220 and starting at the bottom of a stripe. Thus, the final symbol marked in this example is the "A" symbol 202.

In some implementation, each stripe 220 is assigned parameters, such as a print order and a "weight" based on size, location, number of pixels, and time to print the stripe. In some implementations, clipping correction techniques (e.g., leading edge clipping correction and trailing edge clipping correction) are used for the stripes by adding an extra distance or a time delay between stripes to prevent clipping of a symbol by the laser marking device due to the print aperture of the laser marking device. For further details regarding clipping correction techniques, see U.S. Pat. No. 7,046,267, issued on 16 May 2006 and entitled "STRIPING AND CLIPPING CORRECTION", which is hereby incorporated by reference, at column 17, line 1, to column 23, line 56.

As noted above, for a wide field laser marking application, the laser aperture will be much larger, allowing for larger codes to be printed. Thus, in the example of FIG. 2B, the code 200 can be understood as two sub-codes ("ABCD" and "1234") that can be spaced apart vertically by a distance 230. As this distance 230 increases, the print time increase due to the increased movement of the mirror(s) steering the laser beam, and the print quality decreases due to the mirror(s) moving at a very high speed when jumping between the first part of the code and the second part of the code. Note that the example of FIG. 2B is just a simple example, and the issues of print time and print quality become more significant as the code complexity increases.

FIG. 2C shows an example of stripes created for a larger, matrix code 240 to be printed through a laser aperture. In this example, the code 240 can be understood as four sub-codes 242, 244, 246, 248 that are replicated across a wide field of view for a laser marking device. The laser beam steering in this example has the same issue of larger jumps across a vertical distance 230, as addressed above, and the laser beam steering in this example also has to make a jump across a horizontal distance 250, where this distance 250 can also be increased. Note the number of vertical jumps across the distance 230 in the example code 240; the sheer number and size of these jumps can have a negative impact on print time and print quality. Note also that high speed jumps can require a ramp down and stabilizing speed before printing the symbol after a large jump, which can result in poor print quality on the symbol that follows a large jump.

Further, in the event that the stripes are defined narrowly to require the symbols to exactly line up with each other in the specified direction (vertical in this example, see for example, FIG. 13B in U.S. Pat. No. 7,046,267) then further issues can arise. If a user needs to rotate the code/image to be marked to compensate for a mechanical misalignment on a product line, the individual symbols of the code 240 may no longer be exactly aligned with each other, resulting is a separate "stripe" being created for each of the thirty two individual symbols of the code 240, which can result in even more large jumps for the laser beam steering.

Figure 3:
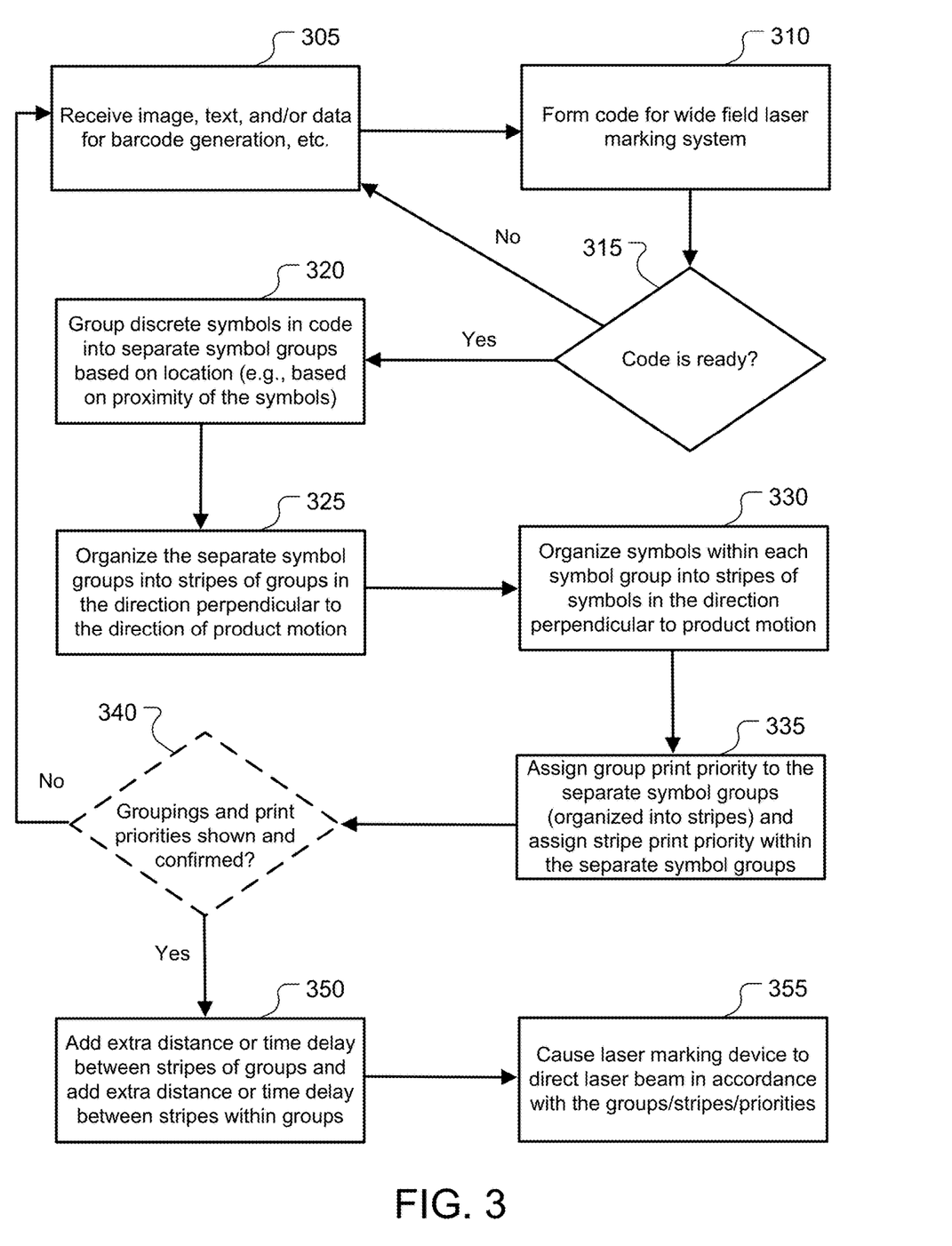
FIG. 3 shows an example of a process for symbol grouping and striping for wide field matrix laser marking.

To address these issues, a symbol grouping technique can be combined with the striping. FIG. 3 shows an example of a process for symbol grouping and striping for wide field matrix laser marking. The process begins by obtaining a code to be printed on products (e.g., labels for products) by a laser marking device (e.g., laser marking devices 140, 140A) configured to direct a laser beam in two orthogonal directions to move between different locations and to dwell at the different locations to form marks. This can involve receiving 305 an image, text, data for barcode generation, etc., or some combination thereof, and then forming 310 the code for a wide field laser marking system using the received input. For example, text can be entered 305 by a user through a user interface (e.g., the UI 162), and this text can be converted 310 to marking locations by a program (e.g., the program 156) using a selected font definition. As another example, data can be entered 305 through the user interface (e.g., the UI 162), and this data can be converted 310 to marking locations of a 1D or 2D barcode by a program (e.g., the program 156) using known barcode generation techniques.

In some implementations, an image can be provided 305 (e.g., through the UI 162) and then processed 310 to determine marking locations where the laser will dwell. For images of logos or graphics, this can include using outlining techniques, as described in U.S. Pat. No. 6,958,762, issued Oct. 25, 2005, and entitled "FILLING AN AREA OF AN IMAGE MARKED ON A MATERIAL WITH A LASER". Such an approach can also be used for images of alphanumeric characters, and/or optical character recognition techniques can be used (e.g., by the program 156). In some implementations, some or all of a sub-code will be repeated across a matrix of products (e.g., sheet 110B, which has a 6×4 matrix of product labels), and so the user interface can include functionality to facilitate this duplication of a sub-code when forming 310 the code for the wide field laser marking system.

This can include copy, cut & paste functions, as is known from standard graphics applications. Additionally or alternatively, simpler user interface options can be provided that are tailored to the laser marking device. For example, an image to be printed can be received 305 along with X and Y coordinates corresponding to the two orthogonal directions (i.e., the unit dimensions of the matrix code, such as the 6×4 matrix of sub-codes shown for sheet 110B), and then the received image can be replicated 310 in accordance with the X and Y coordinates to form the code to be printed. Thus, for example, the UI 162 in FIG. 1A can be used to create multiple images of a code to be printed by allowing the user to select a matrix size (e.g., 5×5 or other equal or different matrix units), a size for each cell in a grid for the matrix, and then design the first cell. The program can then, by default, replicate the content into each cell of the grid for the matrix, and the user can also use the program providing the UI 162 to customize the content for each cell to have unique content.

The user can continue to work on the code until it is ready 315. Once the code is ready for printing, discrete symbols in the code are grouped 320 with each other into separate symbol groups based on the locations of the discrete symbols within a total image area for the code. In some implementations, the grouping 320 of the discrete symbols in the code is done using meta data stored in the image description for the code, such as described in further detail below in connection with FIG. 5A. In some implementations, the grouping 320 of the discrete symbols in the code is done based on proximity of the discrete symbols to each other within the total image area for the code, such as by using a proximity metric to create the groups, as described in further detail below in connection with FIG. 5B. Other clustering algorithms can also be used to group the discrete symbols in the code. Moreover, the result of the grouping 320 can be meta data that defines the groups and is stored in the image description for the code.

Figure 4A:
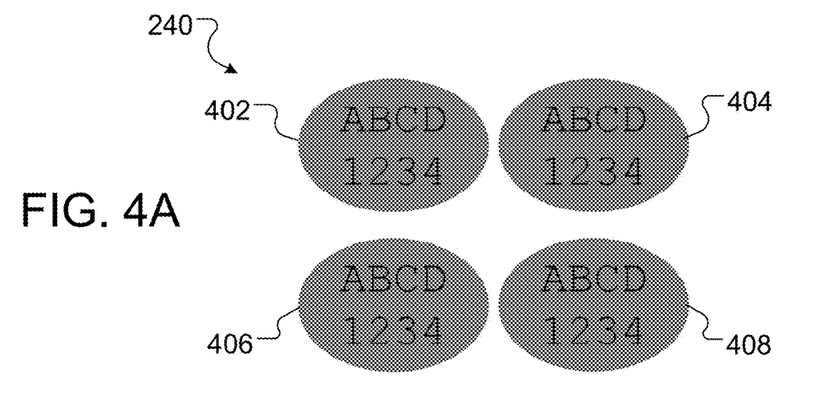
FIG. 4A shows an example of groups created for the code from FIG. 2C.
Figure 4B:
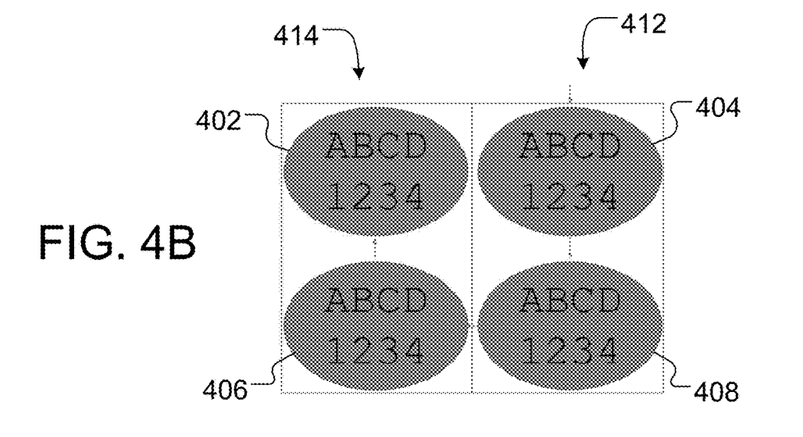
FIG. 4B shows the example of groups of FIG. 4A organized into stripes.

FIG. 4A shows an example of groups 402, 404, 406, 408 created for the code 240 from FIG. 2C. The striping algorithm can then be applied at this macro level to the groups 402, 404, 406, 408, which are treated like individual symbols in the striping process, e.g., in accordance with grouping meta data for the code. This can be understood as a macro-level striping. FIG. 4B shows the example of groups 402, 404, 406, 408 of FIG. 4A organized into stripes 412,

414. Returning to FIG. 3, the separate symbol groups are organized 325 into stripes of groups in the direction perpendicular to the direction of product motion.

The program and/or electronics places each symbol group in one stripe, and does not divide a symbol group into multiple stripes. Further, the program and/or electronics avoids placing more than one symbol group (along a horizontal line, in this example) into a single vertical stripe. In some implementations, the discrete symbol groups are represented by meta data defining groupings of discrete symbols.

Symbol groups are put into the same macro-level stripe if they line up with each other, e.g., in the direction perpendicular to the direction of product motion. In some implementations, this aligning includes no tolerance allowance, and so a set of discrete symbol groups are organized into a stripe only if the bounding boxes/borders for those discrete symbol groups are 100% lined up with each other; if a bounding box/border is off by even a single pixel, a new stripe is created. It should be noted that such alignments of the discrete symbol groups will happen frequently in matrix marking applications. In other implementations, a level of tolerance is built into the system for creation of stripes. For example, a macro-level stripe can still be created if the discrete symbol groups are at least 99% lined up with each other, at least 98% lined up with each other, at least 97% lined up with each other, or at least 96% lined up with each other.

After organizing 325 the separate symbol groups into stripes, the symbols in each respective symbol group are organized 330 into one or more stripes in the direction perpendicular to the direction of motion of the product. The program and/or electronics places each symbol within a group in one stripe, and does not divide a symbol into multiple stripes. Further, the program and/or electronics avoids placing more than one symbol (along a horizontal line, in this example) into a single vertical stripe. In some implementations, the discrete symbols are represented by meta data defining groupings of marking locations.

Symbols are put into the same stripe if they line up with each other, e.g., in the direction perpendicular to the direction of product motion. In some implementations, this aligning includes no tolerance allowance, and so a set of discrete symbols are organized into a stripe only if the bounding boxes/borders for those discrete symbols are 100% lined up with each other; if a bounding box/border is off by even a single pixel, a new stripe is created. In other implementations, a level of tolerance is built into the system for creation of stripes. For example, a symbol-level stripe can still be created if the discrete symbols are at least 99% lined up with each other, at least 98% lined up with each other, at least 97% lined up with each other, or at least 96% lined up with each other.

Figure 4C:
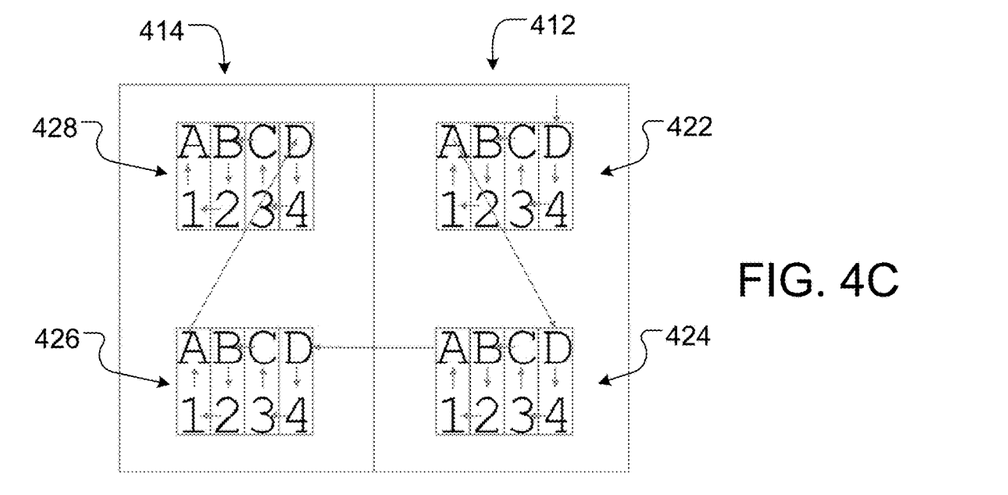
FIG. 4C shows symbols, within stripes of groups, having been organized into additional stripes.

FIG. 4C shows symbols, within stripes 412, 414 of groups, having been organized into additional stripes. Thus, group stripe 412 contains symbol group 404, organized into four stripes 422, and contains symbol group 408 organized into four stripes 424. Likewise, group stripe 414 contains symbol group 402, organized into four stripes 428, and contains symbol group 406 organized into four stripes 426. In addition, the stripes have been prioritized for printing. Thus, FIG. 4B shows that the laser starts and completes stripe 412 before proceeding with stripe 414, and FIG. 4C shows that the laser starts and completes each stripe within a group, in the assigned order, before proceeding to the next group in the macro-stripe, and then to the next macro-stripe. As before, the single headed arrows indicate the order of operations for the laser beam steering. Comparing FIG. 4C with FIG. 2C, it can be seen that the same code is marked using substantially fewer large jumps (three instead of nine) for the steered laser beam, e.g., reducing the number of large, high speed galvanometer jumps improves print quality, and reducing or eliminating the number of long, back and forth galvanometers jumps improves print speed. Thus, laser steering mirrors can be used much more efficiently, and even if the image of the code were rotated slightly (e.g., to compensate for a mechanical misalignment), the macro-groups of symbols will still reduce the number laser beam jumps, thereby improving print time and print quality.

Returning again to FIG. 3, the process can include assigning 335 a group print priority to the separate symbol groups in accordance with a time at which each respective symbol group enters the print aperture of the laser marking device, and assigning 335, for each of the separate symbol groups having two or more stripes, a stripe print priority to the two or more stripes in accordance with a time at which each respective stripe enters the print aperture of the laser marking device. As noted above, each stripe can be assigned a print order, in addition to a weight, e.g., weight=(number of pixels/spots in stripe)*(dwell time per pixel/spot), and the assigned print order can take into account the weight in addition to the print aperture.

In some implementations, the symbol groupings and print priorities can be shown 340 to the user (e.g., through UI 162) such as represented in FIGS. 4A-4C, and the user is then asked to confirm the groupings and print priorities. In some implementations, no user interaction is employed to confirm the symbol groupings and print priorities before proceeding with clipping correction using the defined stripes and print priorities. In some implementations, the symbol groupings can be shown 340 to the user (e.g., through UI 162), and the user is then asked to confirm the groupings, but the assignment of print priorities during the striping can be performed without user interaction, e.g., in real time at the laser printer electronics, along with the clipping correction using the defined stripes and print priorities (e.g., symbol level stripes in a queue, where the order of the stripes in the queue represents the print priorities).

In general, clipping correction involves adding 350 an extra distance or a time delay between stripes to prevent clipping (of a symbol or symbol group) by the laser marking device due to the print aperture of the laser marking device. These stripes can be the stripes formed from the groups of symbols, the stripes formed within each group of symbols, or both. In some implementations, the clipping correction 350 performs on the symbol level stripes and not the macro-stripes. Moreover, it should be noted that the more than one level of striping being described can be applied recursively and can scale beyond two levels, where the levels of macro-stripes help to define the order in which the lower level stripes for the symbols will be marked, and the clipping correction techniques can still be applied to these various manners of organizing the code into stripes.

The laser marking device can be caused 355 to direct the laser beam in accordance with the separate symbol groups, including using the extra distance or the time delay between the stripes to prevent clipping. Thus, the laser marking device can be caused 355 to direct the laser beam to print the separate symbol groups in an order of the group print priority and to print the stripes within each symbol group in an order of the stripe print priority, such as shown, for example, in FIGS. 4B and 4C. Moreover, extra distance and/or time delay can be added, as needed, between stripes to prevent leading edge clipping and trailing edge clipping.

Leading edge clipping may occur (a) when a product is moving too quickly past the laser print window (aperture), and the laser cannot complete its printing, and/or (b) when the printing system needs a high laser dwell time to print each pixel/spot on a product's material, and the laser cannot complete its printing. A trailing portion of the code is thus "clipped" by the leading edge of the laser's aperture, which limits the laser beam from reaching a desired location on the moving product. In other words, the printing system "runs out" of aperture when trying to print on a fast-moving product or when a high dwell time is needed. For further details regarding leading edge clipping, see FIGS. 15A-15E and column 18, line 17, to column 21, line 56, of U.S. Pat. No. 7,046,267.

Adding 350 extra distance between stripes can prevent leading edge clipping when causing 355 the laser marking device to steer the laser beam to mark the code. In some implementations, a clipping correction module uses a trigger input (e.g., from sensor 135 in FIG. 1A) to sense a leading edge of a product for a next print job, which can be put into a clipping correction processing queue. The clipping correction module can poll the queue and run clipping correction on the next job ready to print. In some embodiments, the clipping correction module only uses the stripes and velocity, and does not calculate time. Use of such a queue allows a trigger to be received while the clipping correction module is running clipping correction for a previously triggered print job, which can facilitate real-time clipping correction during laser marking.

Further, as noted above, an encoder and/or resolver can be used as a sensor for product velocity. In some implementations, printing routines/drivers for the laser marking device track the distance a product has moved using an encoder to determine when to start printing. The encoder (e.g., sensor 135 coupled with electronics 146 by wired or wireless connection) tracks speed and distance, which includes the distance between the trigger sensor and the center of the laser aperture. In some implementations, the user sets the trigger distance while taking into account the desired location of the print zone on the product, and the laser will start to print when the product's position has traveled the trigger distance (set by the user) minus the start offset set by the clipping correction module from the trigger location. In other implementations, the size/length of the product is sensed by the system, or is otherwise known by the system, and the trigger distance is determined automatically.

In addition, the speed information provided by the encoder can be used as follows. The clipping correction module can use the known distance of the product when the trigger input is received and the speed input in the following equation to calculate the time when the product will be in front of the laser aperture:

product speed=product's change in distance/change in time.

For a stripe n:

Stripe Print Timer$_n$=(Number Of Points in Address Space of electronics)*(Dwell Time Per Point In Stripe)

"Stripe Print Time" may be used to find "Stripe Travel Distance":

Stripe Travel Distance$n$=Stripe Print Time*Speed

"Stripe Travel Distance" may be used to find "Trailing Edge Clipping Position" and "Leading Edge Clipping Position" of the stripe:

TEC$_n$(Trailing Edge Clipping Position of Stripe $n$)=Stripe Static TEC Position+Σ(from $i=0$ up to $i=(n-1)$)[Stripe Travel Distance$_i$]

LEC$_n$(Leading Edge Clipping Position of Stripe $n$)=TEC$_n$–Stripe Width$_n$–Stripe Travel Distance$_n$ "Stripe Static TEC Position" is the trailing edge of the stripe if the entire code was printed in the aperture with zero speed. This means every stripe had zero "Stripe Travel Distance."

"LEC" may be used to find "Start Offset":

Start Offset(Starting Position of Entire Print in Aperture)=Maximum LEC–Aperture Size The "Clipping Correction Value" may be calculated as follows:

Clipping Correction Value=Σ(from $k=0$ up to $k=$(Total Number of Stripes–2))[Σ(from $j=$(Total Number of Stripes–1)down to $j=k$)[(LEC$_j$–TEC$_k$–Aperture Size)/($j-k$)]]

Where Σ represents a summation with j, and k as integer variables in the formula. The equation adds the result of (LEC$_j$–TEC$_k$–Aperture Size)/(j–k) when k=0 and j=(Total Number of Stripes–1) with the result of (LEC$_j$–TEC$_k$ –Aperture Size)/(j–k) when k=0 and j=((Total Number of Stripes–1)–1), and so on until j=k=0. The equation takes that value and adds it to the result of the same process with k=1. The equation repeats this until k reaches (Total Number of Stripes–2).

The clipping correction module can use (a) the weight of the stripes (time) and (b) the speed input (speed=distance/time) from the speed sensor (e.g., encoder 135) to calculate a minimal amount of spreading between printing consecutive/adjacent stripes to fit every stripe in a desired print zone on the product. The result of Time×(Distance/Time) is distance. Spreading allows each stripe to be printed on the product as the product passes through the aperture. Spreading can add equal visual spaces between adjacent stripes such that adjacent stripes are equidistant across an entire printed image. Note that the reason for spreading is to push all stripe print zones back into the aperture by an equal amount while they are printing. This prevents the stripes from running into the aperture wall and clipping. Pushing the print zones of the stripes back in the aperture results in visual spaces between the stripes seen on the product. In some implementations, the clipping correction module calculates the minimum space(s) needed to fit all the stripes in the desired print zone and use as little space on the product as possible.

Using the start offset as input, the printing routines/drivers track the encoder to know when to start printing. The start offset value will cause the printing routines/drivers to start printing sooner than the "Trigger Distance" (e.g., as set by the user) by an amount equal to the start offset. The clipping correction module can also output another value to the real-time printing routines/drivers: the Clipping Correction Value, which indicates the offset for in-between stripes to adjust for clipping while printing. The printed image of the code may thus be spread horizontally to prevent clipping, but it is still readable.

Trailing edge clipping may occur when the printing system tries to (a) print an image on a product that is moving too slowly past the laser print window (aperture), and/or (b) print a long image on a product, e.g., total length of image is longer than the aperture. The desired print location on the product to print a symbol of the code does not enter the aperture on time as expected, and the "trailing edge" of the aperture limits the print beam from reaching the desired location on the product. As a result, one or more symbols of the code (or portion(s) thereof) are printed in the wrong location on the product or symbols are printed on top of each other (overlapping symbols). For further details regarding trailing edge clipping, see FIGS. 16A-16C and column 19, line 54, to column 23, line 8, of U.S. Pat. No. 7,046,267.

Adding 350 extra time between stripes can prevent trailing edge clipping when causing 355 the laser marking device to steer the laser beam to mark the code. In some implementations, the clipping correction module provides real-time trailing edge clipping correction to print stripes on a product moving at a slow speed or to print stripes of codes that are longer than the aperture. Trailing edge clipping correction turns off the laser (or redirects the laser to a beam dump) and delays printing until a proper location (print zone for a stripe) on the product has entered the aperture. The clipping correction module can use the following equation to derive a time delay when a desired print zone will enter the aperture:

time delay=(distance outside aperture)/speed of product

In some implementations, the clipping correction module adds time delay(s) to start printing a stripe when the desired stripe location is substantially centered in the aperture.

In addition, in some implementations, after the leading edge of the product has moved past the trigger, the clipping correction module or the real-time printing routines/drivers reevaluate the speed input between every printed stripe. If the speed of the product has changed, the clipping correction module updates the Clipping Correction Value in real-time. For example, if the clipping correction module senses that the speed of the product has increased while or after the laser prints a given stripe, the clipping correction module can update, i.e., increase, the Clipping Correction Value to increase spreading. Thus, the spaces between stripes need not be equal. Moreover, if the speed of the product decreases, the clipping correction module adds a time delay to wait for a desired print zone to enter the aperture before printing the next stripe. For further details regarding such update clipping correction, see FIGS. 14D-14E and column 23, lines 9-56, of U.S. Pat. No. 7,046,267.

As addressed above, the striping, leading edge clipping correction, trailing edge clipping correction and update clipping correction can be performed in real-time during operation of the laser marking device. In some implementations, one or more of these are done in advance of a particular printing job. Further, the techniques described above can be implemented using software, firmware, hardware, and combinations thereof. For example, in some implementations, an image processing module organizes an image of the code into stripes and sends the stripes to a clipping correction module.

In some implementations, a striping module at the laser printer generates symbol level stripes for a code from a computer in accordance with one or more levels of macro (grouped symbol) striping, e.g., in accordance with meta data stored in an image description for the code. The striping module sends the stripes to a first-in-first-out queue, which is accessed by the clipping correction module; the striping module feeds the symbol level stripes to the queue in the order determined by the macro-stripes of the symbol groups. The clipping correction module receives the stripes, a trigger input to start printing, and a velocity input, and outputs a clipping correction value to real-time printing routines/drivers, which use the value to control printing by the laser marking device, e.g., on a moving product. Further, the clipping correction module or the printing routines/drivers can determine whether a velocity of the product has changed, and if so, the clipping correction module determines a new clipping correction value.

Figure 5A:
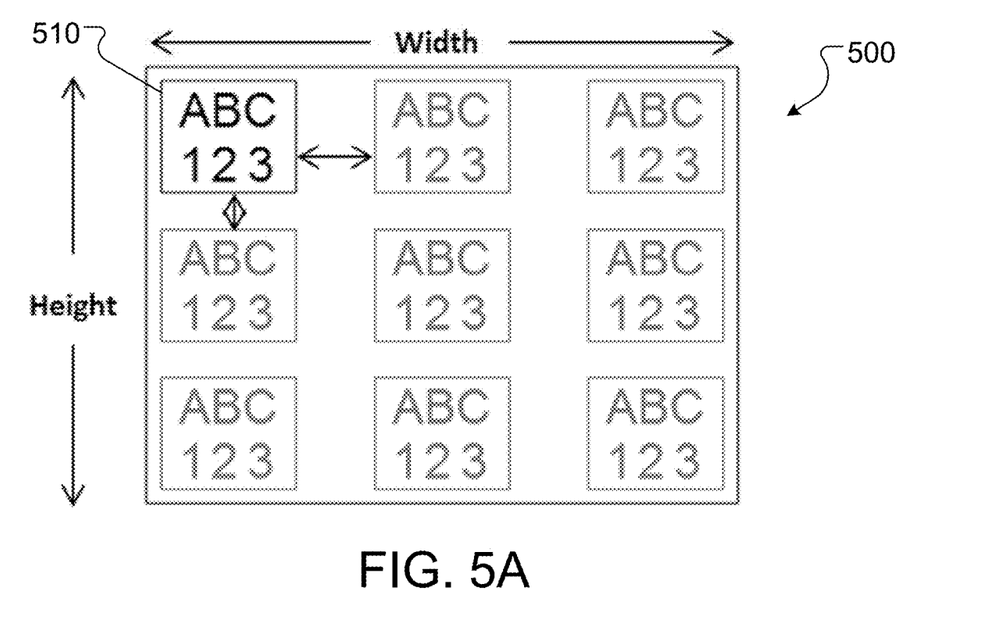
FIG. 5A shows an example of grouping discrete symbols in a code into separate symbol groups based on proximity.

In addition, as noted above, the grouping 320 of nearby fields of marking locations (and thus symbols) can be done using meta data stored in the image description for the code, or can be done automatically, e.g., using a proximity metric to create the groups. FIG. 5A shows an example of grouping 320 discrete symbols in a code into separate symbol groups based on locations, which are defined by meta data generated for the code. An example of a UI screen 500 is shown, as can be used in the UI 162 of FIG. 1A.

In this example of a UI screen 500, the user picks an image size and creates an image 510 to be printed. Using a matrix option in the UI, the user also defines the X and Y (width and height) coordinates for the full code to be printed. The program (e.g., program 156) then replicates the image 510 across the full dimensions of the code to create the matrix code. In this example, the matrix code is 3×3, i.e., the image 510 (containing a code of "ABC" over "123") is replicated eight times to fill out a 3×3 product matrix.

Figure 5B:
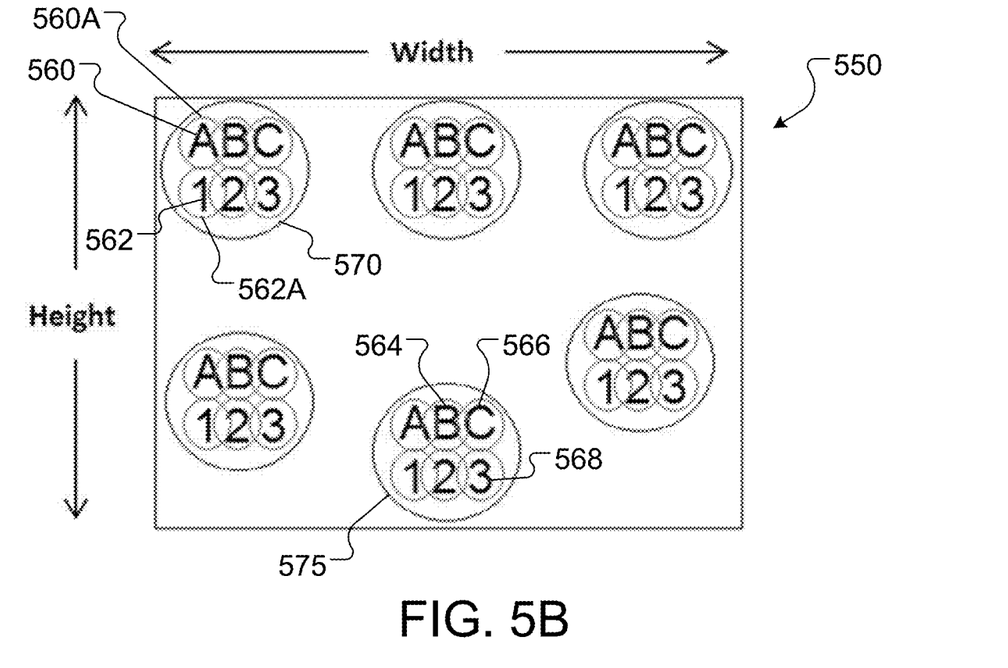
FIG. 5B shows another example of grouping discrete symbols in a code into separate symbol groups based on proximity.

FIG. 5B shows another example of grouping discrete symbols in a code into separate symbol groups based on locations, where proximity of the locations are used to form the groups, as determined by the program and/or the user. An example of a UI screen 550 is shown, as can be used in the UI 162 of FIG. 1A. In this example of a UI screen 550, the user manually places each of the images to be printed into the code area (width and height). Then through an automated process, the program (e.g., program 156) determines the groupings by defining a containing boundary for each of the discrete symbols and grouping discrete symbols whose containing boundaries overlap each other. The containing boundary for each discrete symbol can have various shapes, such as a circle, as shown in FIG. 5B.

Thus, for example, the program (e.g., program 156) can identify each character in the image area, such as characters 560, 562, 564, 566, 568, and also place an imaginary circle at a fixed size around each identified character. In this example, the circles have a diameter equal to one and half times a size of the characters, but other sizes for the circles (or other containing shapes) are also possible provided the shape is sized to be larger than the characters. In some implementations, the size (and potentially the shape as well) of the containing boundary for each discrete symbol is set in accordance with user input.

With the containing boundaries placed, the program (e.g., program 156) groups any characters whose containing boundaries overlap. A character that does not have a containing boundary that overlaps (directly or through one or more intermediate containing boundaries) with another containing boundary is considered a different group. Thus, in the example shown, identified characters 560, 562 are included in symbol group 570 because their containing boundaries 560A, 562A overlap, and identified characters 564, 566, 568 are included in symbol group 575 because their containing boundaries overlap. Note that identified character 564 has a containing boundary that does not directly overlap with the containing boundary of identified character 568, but it does overlap indirectly through identified character 566. Also, symbol group 575 is shown in a location that is offset from the usual matrix code to highlight that this approach allows for the random placement of symbols within the code area, and the program will automatically identify appropriate groups of symbols in the code.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers, and the term "computer readable medium" indicates a tangible (non-transitory) medium on which instructions can be encoded and read by a data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
obtaining a code to be printed on one or more products by a laser marking device configured to direct a laser beam in two orthogonal directions to move between different locations and to dwell at the different locations to form marks on the one or more products;
grouping discrete symbols in the code with each other into separate symbol groups based on locations of the discrete symbols in the code;
organizing one or more symbols in each respective symbol group into one or more stripes in a direction perpendicular to a direction of motion of the one or more products in a product line configured to move products through a facility;
adding an extra distance or a time delay between stripes in at least one of the separate symbol groups to prevent clipping of a symbol by the laser marking device due to a print aperture of the laser marking device; and
causing the laser marking device to direct the laser beam in accordance with the separate symbol groups, including using the extra distance or the time delay between the stripes in the at least one of the separate symbol groups.

2. The method of claim 1, comprising:
assigning a group print priority to the separate symbol groups in accordance with a time at which each respective symbol group enters the print aperture of the laser marking device; and
assigning, for each of the separate symbol groups having two or more stripes, a stripe print priority to the two or more stripes in accordance with a time at which each respective stripe enters the print aperture of the laser marking device;
wherein causing the laser marking device to direct the laser beam in accordance with the separate symbol groups comprises causing the laser marking device to direct the laser beam to print the separate symbol groups in an order of the group print priority and to print the two or more stripes within a symbol group in an order of the stripe print priority.

3. The method of claim 2, comprising:
organizing the separate symbol groups into stripes of groups in the direction perpendicular to the direction of motion of the one or more products in the product line configured to move products through the facility;
wherein assigning the group print priority comprises treating each of the stripes of groups as a single group for priority assignment.

4. The method of claim 3, wherein the separate symbol groups organized into stripes of groups comprise at least four separate symbol groups.

5. The method of claim 2, wherein obtaining the code to be printed on the one or more products by the laser marking device comprises:
receiving an image to be printed;
receiving X and Y coordinates corresponding to the two orthogonal directions; and
replicating the image in accordance with the X and Y coordinates to form the code to be printed.

6. The method of claim 1, wherein grouping the discrete symbols in the code comprises grouping the discrete symbols in the code based on proximity of the discrete symbols to each other.

7. The method of claim 6, wherein grouping the discrete symbols in the code comprises:
defining a containing boundary for each of the discrete symbols in the code; and
grouping discrete symbols whose containing boundaries overlap each other.

8. The method of claim 7, wherein the containing boundary for each discrete symbol is set as a circle having a diameter equal to one and a half times a size of the symbol.

9. The method of claim 7, wherein the containing boundary for each discrete symbol is set in accordance with user input.

10. A system comprising:
a product line configured to move products through a facility;
a laser marking device arranged with respect to the product line and configured to direct a laser beam in two orthogonal directions to move between different locations and to dwell at the different locations to form marks on the products; and
a laser marking device controller communicatively coupled with the laser marking device, the laser marking device controller being configured to obtain a code to be printed on the products, group discrete symbols in the code with each other into separate symbol groups based on locations of the discrete symbols in the code, organize one or more symbols in each respective symbol group into one or more stripes in a direction perpendicular to a direction of motion of the products in the product line, add an extra distance or a time delay between stripes in at least one of the separate symbol groups to prevent clipping of a symbol by the laser marking device due to a print aperture of the laser marking device, and cause the laser marking device to direct the laser beam in accordance with the separate symbol groups, including using the extra distance or the time delay between the stripes in the at least one of the separate symbol groups.

11. The system of claim 10, wherein the laser marking device controller is configured to assign a group print priority to the separate symbol groups in accordance with a time at which each respective symbol group enters the print aperture of the laser marking device, assign, for each of the separate symbol groups having two or more stripes, a stripe print priority to the two or more stripes in accordance with a time at which each respective stripe enters the print aperture of the laser marking device, and cause the laser marking device to direct the laser beam to print the separate symbol groups in an order of the group print priority and to print the two or more stripes within a symbol group in an order of the stripe print priority.

12. The system of claim 11, wherein the laser marking device controller is configured to organize the separate symbol groups into stripes of groups in the direction perpendicular to the direction of motion of the one or more products in the product line configured to move products through the facility, and treat each of the stripes of groups as a single group for priority assignment.

13. The system of claim 12, wherein the separate symbol groups organized into stripes of groups comprise at least four separate symbol groups.

14. The system of claim 11, wherein the laser marking device controller is configured to obtain the code to be printed on the one or more products by the laser marking device by receiving an image to be printed, receive X and Y coordinates corresponding to the two orthogonal directions, and replicate the image in accordance with the X and Y coordinates to form the code to be printed.

15. The system of claim 1, wherein the laser marking device controller is configured to group the discrete symbols in the code based on proximity of the discrete symbols to each other.

16. The system of claim 15, wherein the laser marking device controller is configured to group the discrete symbols in the code by defining a containing boundary for each of the discrete symbols in the code, and grouping discrete symbols whose containing boundaries overlap each other.

17. The system of claim 16, wherein the containing boundary for each discrete symbol is set as a circle having a diameter equal to one and a half times a size of the symbol.

18. The system of claim 16, wherein the containing boundary for each discrete symbol is set in accordance with user input.

19. The system of claim 10, wherein the laser marking device controller comprises:
   electronics that are integrated with the laser marking device; and
   a computer that is separate from the laser marking device.

20. The system of claim 10, wherein the facility is a product manufacturing facility and the product line is a product packaging system.

21. A computer readable medium encoding instructions operable to cause data processing apparatus to perform operations comprising:
   obtaining a code to be printed on one or more products by a laser marking device configured to direct a laser beam in two orthogonal directions to move between different locations and to dwell at the different locations to form marks on the one or more products;
   grouping discrete symbols in the code with each other into separate symbol groups based on locations of the discrete symbols in the code;
   organizing one or more symbols in each respective symbol group into one or more stripes in a direction perpendicular to a direction of motion of the one or more products in a product line configured to move products through a facility;
   adding an extra distance or a time delay between stripes in at least one of the separate symbol groups to prevent clipping of a symbol by the laser marking device due to a print aperture of the laser marking device; and
   causing the laser marking device to direct the laser beam in accordance with the separate symbol groups, including using the extra distance or the time delay between the stripes in the at least one of the separate symbol groups.

* * * * *

UNITED STATES PATENT AND TRADEMARK OFFICE
CERTIFICATE OF CORRECTION

PATENT NO. : 10,583,668 B2
APPLICATION NO. : 16/057756
DATED : March 10, 2020
INVENTOR(S) : Andrew Yohn Page 1 of 1

It is certified that error appears in the above-identified patent and that said Letters Patent is hereby corrected as shown below:

In the Claims

Column 21, Line 3, in Claim 15, please delete "claim 1" and insert -- claim 10 -- therefor.

Signed and Sealed this
Twenty-sixth Day of May, 2020

Andrei Iancu
*Director of the United States Patent and Trademark Office*